Figure 1:
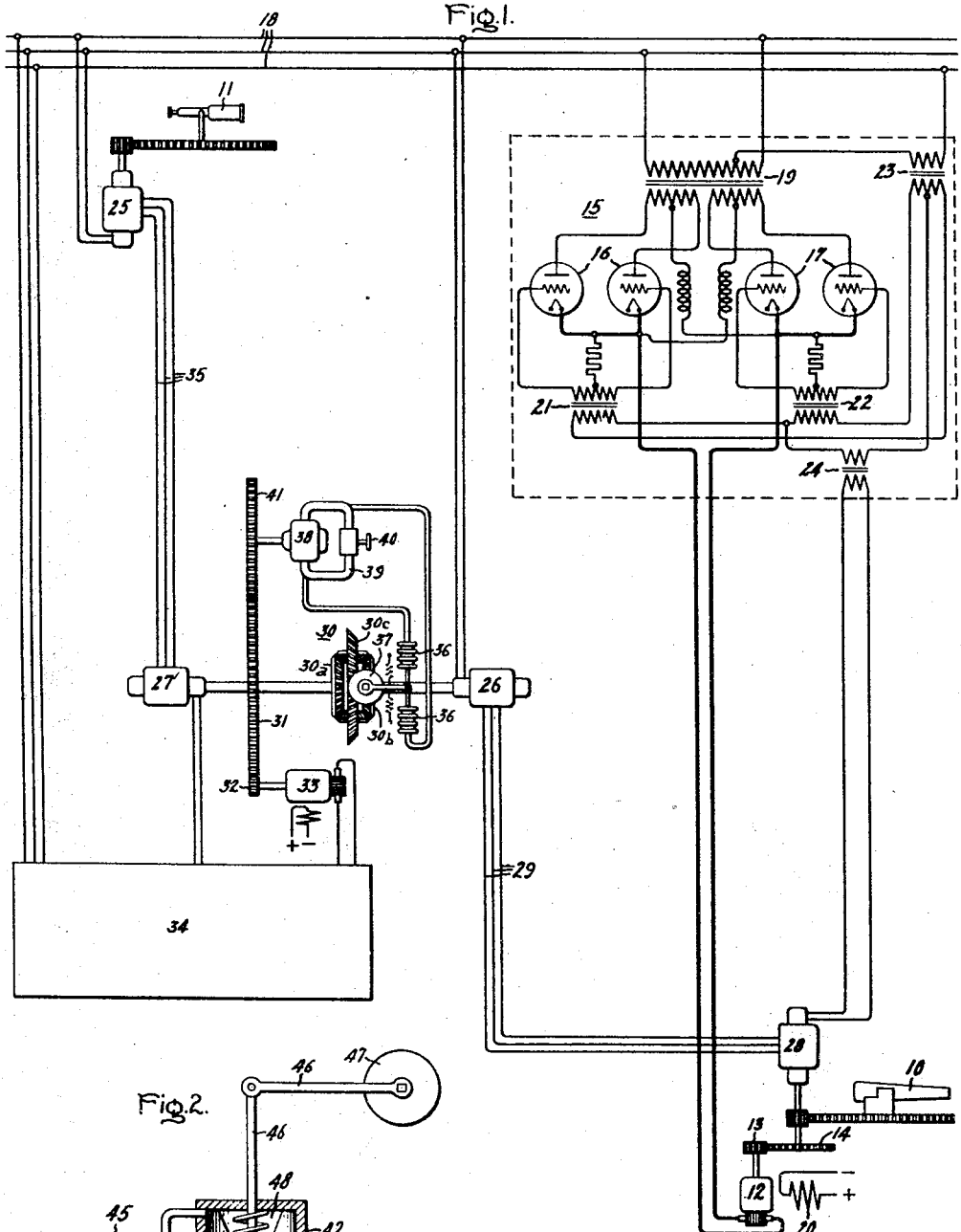

Jan. 28, 1947. E. F. W. ALEXANDERSON 2,414,919
FOLLOW-UP CONTROL SYSTEM
Filed Sept. 21, 1935 3 Sheets-Sheet 1

Inventor:
Ernst F. W. Alexanderson,
by Harry E. Dunham
His Attorney.

Jan. 28, 1947.    E. F. W. ALEXANDERSON    2,414,919
FOLLOW-UP CONTROL SYSTEM
Filed Sept. 21, 1935    3 Sheets-Sheet 3

Inventor:
Ernst F.W. Alexanderson,
by Harry E. Dunham
His Attorney.

Patented Jan. 28, 1947

2,414,919

UNITED STATES PATENT OFFICE 2,414,919

FOLLOW-UP CONTROL SYSTEM

Ernst F. W. Alexanderson, Schenectady, N. Y., assignor to General Electric Company, a corporation of New York Application September 21, 1935, Serial No. 41,580

16 Claims. (Cl. 172—239)

This invention relates to control systems, more particularly to the class of control system known as follow-up control systems, in which a remote object is driven into correspondence with a pilot device, and an object of the invention is the provision of a simple, reliable, efficient, and improved control system of this character.

If a heavy or massive object, such as a naval gun, is to be driven in correspondence with the movement of a light pilot device, such as a manually movable sighting telescope, the control system is generally referred to as a torque amplifying system, because a much greater torque is required to move the object than is required to move the pilot device. In systems of this character, means are provided for driving the driven object, and a power control is provided for controlling the supply of power to the driving means. The power control is influenced differentially by the motion of the pilot device and the motion of the driven object. Assuming the power control to be in the form of a valve, either electrical or mechanical, full speed of the driven object requires full opening of the power control. This opening may be represented by an angle, which in a typical case may be 1° of movement for the controlling element of an electrical control, or a predetermined number of revolutions of the control shaft of a mechanical control valve. In either case, this full opening is brought about by the driven object lagging the pilot device by an angle which in a typical case may also be assumed to be 1°. Thus, for full speed, the error is 1°. This error is referred to as the dynamic accuracy. An opening of the power control of approximately 1° is usually sufficient to move the driven object very slowly from one static position to another. This accuracy, which is referred to as the static accuracy of correspondence is sufficient. An important object of this invention is the provision of means for bringing about a dynamic accuracy equivalent to the static accuracy.

In carrying the invention into effect in one form thereof, the pilot device and driven object acts differentially to control the driving means to drive the driven object toward correspondence with the pilot device at a velocity proportional to the positional disagreement between the pilot device and driven object, and means responsive to the velocity of the pilot device are provided for controlling the driving means to advance the position of the driven object an amount proportional to the velocity. A specific embodiment of the invention utilizes an electrical transmitting device actuated by the pilot device and an electrical receiving device connected to the driving means, together with connections between the two devices for actuating the power control in accordance with the positional disagreement of the pilot device and driven object. A differential device is included in these connections and means for measuring the velocity of the pilot device are provided for actuating this differential device to act upon the power control so as to cause the driving means to advance the driven object an amount equal to that by which the driven object would otherwise have to lag the pilot device in order to cause the driven object to move at the same velocity as the pilot device.

Another aspect of the invention relates to follow-up systems in which the driving power for the driven object is supplied through a fluid pressure variable speed transmission device whose operating characteristics tend to produce instability and oscillations in the system. Accordingly, a further object of this invention is the provision of means for eliminating these undesirable characteristics in a system utilizing such a transmission device so that the system will have the desired stability and accuracy.

In illustrating the invention in one form thereof, it is shown as embodied in a control system for causing a gun to reproduce the movements and positions of a sighting telescope, but it will be understood of course that the control system has other industrial applications.

Figure 2:
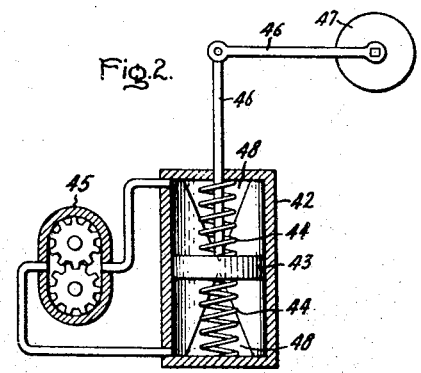
Figure 3:
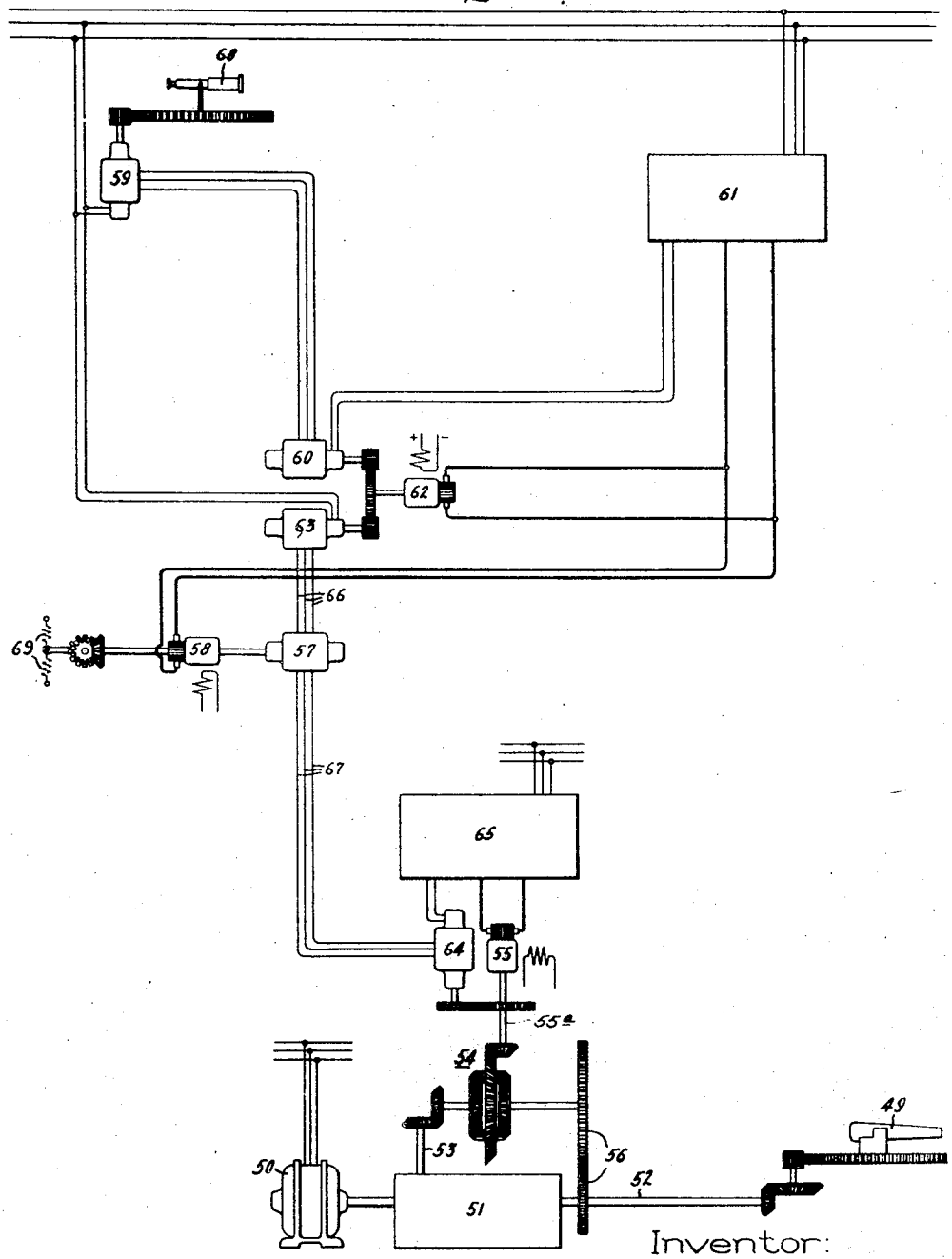
Figure 4:
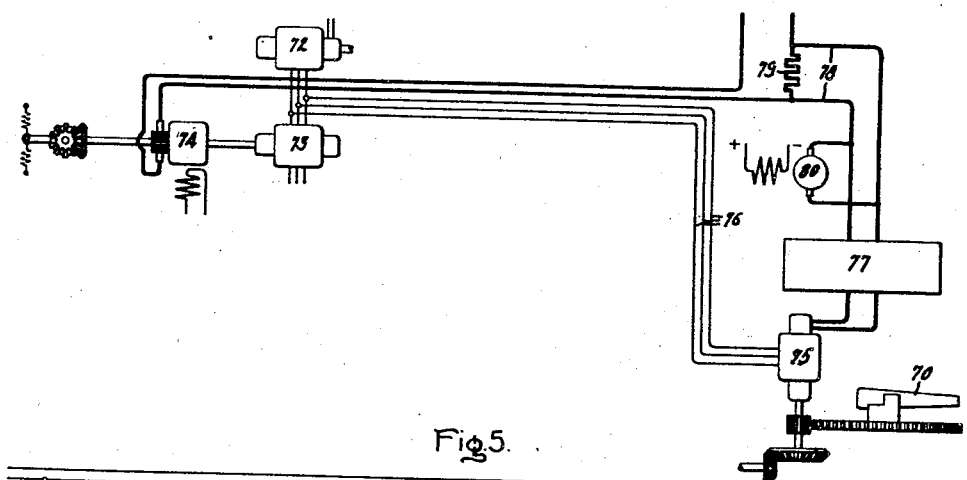
Figure 5:
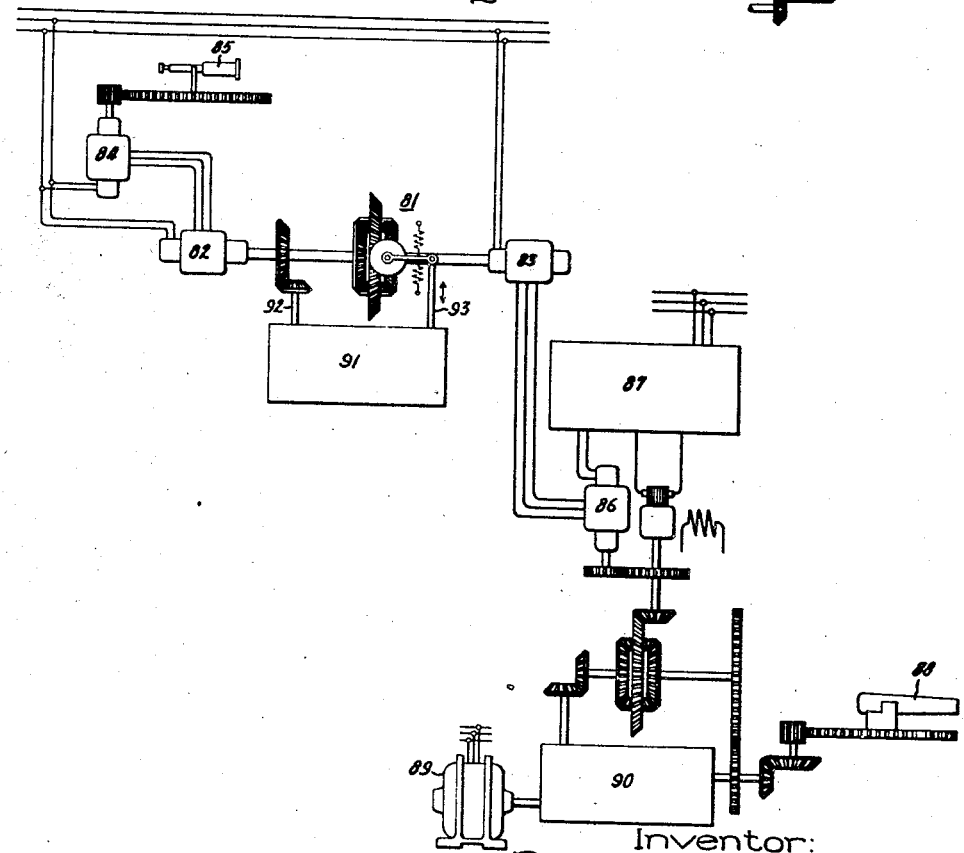

For a better and more complete understanding of the invention reference should now be had to the following specification and to the accompanying drawings in which Fig. 1 is a simple, diagrammatical illustration of an embodiment of the invention; Fig. 2 is a detail utilized in a modification of Fig. 1; Fig. 3 is a simple schematic diagrammatical illustration of a modification of the modification of Fig. 1; Fig. 4 is a modification of Fig. 3 and Fig. 5 is a diagrammatical representation of the modification of the system of Fig. 1.

Referring now to the drawings, an object such as a gun 10, is rotated in train under the control of a control or pilot device represented by the telescope 11. The gun 10 is driven by any suitable driving means, such for example as the direct current electric motor 12 to whose drive shaft, the gun mounting platform is connected by suitable reduction gearing 13, 14. Direct current is supplied to the armature of this motor by any suitable means, such for example as the electric valve apparatus 15 illustrated as comprising a pair of electric valves 16 for supplying current in one direction to the armature of the motor 12 and a second pair of valves 17 for supplying direct current to the armature in the reverse direction. The electric valves are in turn supplied from a suitable source of alternating voltage, represented by the supply lines 18, through a suitable supply transformer 19, the primary winding of which is connected to the middle and upper supply lines 10 and the secondary windings of which are connected to the anodes of the four valves as illustrated. The direct current motor 12 is provided with a separately excited field winding 20 which is supplied from any suitable separate source of direct current such as that represented by the plus and minus signs.

Although the electric valves may be of any suitable type, they are preferably of the three electrode type having a small quantity of an inert gas introduced into the envelope after exhaust. This inert gas may be mercury vapor or any other suitable gas and it serves to change the usual electronic discharge into an arc stream, thereby constituting the valve a grid controlled arc rectifier.

The average value of the current flowing in the anode circuit of electric valves of this character can be controlled by varying the phase relationship between the voltages applied to the grids and to the anodes respectively. When the grid voltage is substantially in phase with the anode voltage, the current flowing in the anode circuit is maximum, and when the grid voltage is lagging with respect to the anode voltage by a predetermined amount, usually more than 90°, the current flowing in the anode circuit is a minimum or substantially zero. For intermediate phase relationships, the current flow has corresponding intermediate values.

Alternating voltage is supplied to the grids of the electric valves 16 and 17 by means of grid transformers 21 and 22, respectively, the primary windings of which are connected in series relationship with the secondary winding of a grid biasing transformer 23, one of the terminals of whose primary winding is connected to an intermediate tap of the primary winding of the supply transformer 19 and whose other terminal is connected to the lower supply line 18. This connection of the primary winding of the biasing transformer serves to derive a voltage for the grid or input circuit of the electric valve which is more than 90° lagging with respect to the anode voltage so that both pairs of valves are held at cut off and de-energized and supply no current to the armature of the motor 12.

For the purpose of varying this phase relationship of the grid and anode voltages, a component voltage is supplied to the grid or input circuit through a transformer, one terminal of the secondary winding of which is connected to the common point between the primary windings of the grid transformers 21 and 22 and the opposite terminal of which is connected to an intermediate point of the secondary winding of the bias transformer 23. This component voltage is substantially in phase with the anode voltage of one pair of valves and, therefore, of course, substantially 180° out of phase with the anode voltage of the other pair of valves. Thus, it will be seen that by varying the magnitude of this component voltage, the phase relationship of the resultant grid voltage, i. e., the vectoral sum of the component voltage and the grid bias voltage may be varied as desired and likewise, the magnitude of the current supplied to the electric motor is correspondingly varied. It will also be seen, that by reversing the polarity of this component voltage and varying its magnitude, the opposite pair of valves will be energized and caused to supply a current to the electric motor having a value dependent upon the magnitude of the component voltage. For the purpose of varying the magnitude of the component voltage supplied to the grid circuit of the electric valve apparatus, suitable rotary induction apparatus actuated differentially by the telescope 11 and the gun 10 is provided. This rotary induction apparatus comprises two electrical transmitting devices 25 and 26 and two electrical receiving devices 27 and 28.

The transmitting device 25 comprises a rotor member provided with a single circuit winding (not shown) and a stator member provided with a distributed poly-circuit winding (not shown) which is physically similar to a three-phase winding. The single circuit rotor winding is connected to the upper and middle supply lines 18. The transmitting device 26 is in all respects identical with the transmitting device 25 and its single phase rotor winding is similarly connected to the top and middle supply lines 18. As indicated, the receiving device 28 is in all respects identical with the transmitting devices 25 and 26. However, the rotor winding of the receiving device is connected to the primary winding of the transformer 24 and the terminals of the stator winding are connected by means of conductors 29 to corresponding terminals of the stator winding of the transmitting device 26.

The single circuit winding of the transmitter 26, when energized, produces an alternating magnetic field by means of which a voltage is induced in the stator winding, thereby causing a current to flow in the stator winding of the receiver 28. This current in turn produces an alternating magnetic field by means of which a voltage is induced in the rotor winding of the receiver when the relationship between the axis of the rotor winding and the axis of the magnetic field is other than 90°. Therefore, when this 90° relationship obtains, no voltage is induced in the rotor winding and consequently no component voltage is supplied to the grid circuit of the electric valve apparatus with the result that the system is de-energized and at rest.

The rotor member of the receiving device 28 is connected through the gearing 14 to the shaft of the electric motor 12. Similarly, the rotor member of the transmitting device 26 is connected through a differential device 30 to the rotor member of the receiving device 27 and through gearing 31, 32 to the shaft of an electric motor 33. This motor 33 is a direct current motor similar to the motor 12 and is supplied with direct current from a suitable source conventionally represented by electric valve apparatus 34 which is in all respects identical with the electric valve apparatus 15. The rotor winding of the receiving device 27 is connected to the grid or input circuit of the electric valve apparatus 34 and the terminals of the stator winding are connected by means of connections 35 to corresponding terminals of the stator winding of the transmitter 25.

From the foregoing, it will be seen that the transmitting devices 25, 26, the receiving devices 27, 28 and the electrical connections 29, 35 constitute connections between the sighting telescope 11 and the driving motor 12. And it will also be seen that the differential device 30 is interposed in these connections. As shown, this differential device comprises an input gear 30a connected through gearing 31, 32 to the shaft of motor 33, an output gear 30b connected to the rotor shaft of the transmitter 26 and a third element 30c carrying a pair of planetary pinions meshing with input and output gears 30a and 30b. The third element of the differential device is actuated in one direction or the other by suitable means illustrated as a flexible metal bellows 36 to which it is connected by means of a gear 37. These bellows in turn are actuated by fluid pressure supplied from a suitable means illustrated as an oil pump 38. Although this pump may be of any suitable type, it is preferably a positive displacement, gear type pump provided with a suitable by-passing system 39 in which a by-pass valve 40 is interposed.

The rotor of the pump 38 is connected through gearing 41, 31, 32 to the shaft of the motor 33 and the by-pass valve 40 is so adjusted that the fluid pressure developed by the pump is substantially proportional to the velocity, i. e., the rotation of the motor 33.

With the above understanding of the apparatus and its organization in the completed system, the operation of the system itself will readily be understood from the following detailed description:

Rotation of the telescope 11 produces a corresponding rotation of the axis of the magnetic field of the stator winding of the receiving device 27. As a result of this change in the position of the magnetic field, a voltage is induced in the rotor winding of the receiver which is supplied as a component voltage to the grid circuit of the electric valve apparatus 34, thereby energizing the electric valve apparatus and causing it to supply current to the electric motor 33 for rotation in the direction corresponding to the direction of rotation of the telescope 11. Since the rotor member of the receiver 27 is connected through gearing 31, 32 to the motor 33, the rotor member of the receiver is likewise rotated in a direction corresponding to the direction of rotation of the telescope. If the telescope is stopped, the motor 33 will finally drive the rotor member of the receiver to a position such that the axis of the rotor winding is at right angles to the magnetic field of the stator winding with the result that the component voltage is reduced to zero, the electric valve apparatus 34 is deenergized and the motor 33 is stopped.

This rotation of the motor 33 also drives the rotor member of the transmitter 26. Since the third element 30c of the differential is held at rest by the bellows 36 when the motor 33 begins to rotate, the rotor of the transmitter 26 is rotated the same amount as the rotor of the receiver 27. Since the motor 33 is comparatively lightly loaded, the rotor of the receiver 27 is driven in very close correspondence with the position of the rotor of the transmitting device 25 and therefore, the rotor of the transmitter 26 is driven in very close correspondence with the rotor of the transmitter 25 and also with the telescope 11 to which the rotor of the transmitter 35 is connected.

As the rotor of the transmitter 26 is rotated, the axis of the magnetic field of the stator winding of the receiving device 28 is rotated a corresponding amount and as a result, a voltage is induced in the rotor winding of the receiver 28 and is supplied as a component voltage through the transformer 24 to the grid circuit of the electric valve apparatus 15. This component voltage varies in magnitude in proportion to the angle by which the rotor of the receiver 28 lags the rotor of the transmitter 26, or in other words by an amount proportional to the angle of lag between the driven object 10 and the pilot device 11. As this component voltage increases, it advances the phase of the grid voltage of one of the pairs of valves 16, 17 with respect to the anode voltage and causes this pair of valves to supply a direct current to the armature of the motor 12 in such a direction that the motor 12 drives the gun 10 in a direction corresponding to the direction in which the telescope 11 is moved.

If the telescope 11 is being moved at a speed equivalent to the maximum speed at which the motor 12 can drive the gun 10, it will be clear that the rotor member of the receiver 28 must lag the rotor member of the transmitter 26 by the amount necessary to produce a component voltage sufficient to cause the electric valve apparatus to supply the amount of current required to drive the motor 12 at maximum speed. For lesser speeds, the component voltage required is correspondingly less and therefore, the rotor of the receiver 28 will lag the rotor of the transmitter 26 by a correspondingly smaller angle. It will, therefore, be seen that the component voltage required to energize the electric valve apparatus to drive the gun 10 at any velocity is proportional to that velocity and that the rotor of the receiver 28 must therefore lag the rotor of the transmitter 26 by an angle proportional to the velocity. And it will also be seen that in the absence of the provision of any special means for preventing it, the gun 10 must lag the telescope 11 by an angle proportional to the velocity of the telescope. As previously pointed out, this would be undesirable and is prevented by advancing the rotor of the intermediate transmitter 26 an angle proportional to the velocity of the telescope 11. Since the motor 33 is driven at a speed which is substantially proportional to the speed of the telescope 11, the oil pump 38 which is driven by the motor 33, produces a pressure substantially proportional to the speed of the telescope, and this pressure is applied to the bellows 36, which respond to rotate the gear 37 and the gear 30c of the differential device an amount proportional to the pressure and also proportional to the velocity of the telescope 11. Rotation of the gear 30c produces a rotation of the rotor of the transmitter 26. The connections of the bellows to the oil pump are so chosen that the rotation of the rotor of the transmitter 26 is in the same direction as that in which the rotor was driven by the motor 33. In other words, the position of the rotor of the transmitter 36 is advanced by an angle proportional to the velocity of the telescope 11. This advance in the position of the rotor of the transmitter momentarily increases the component voltage supplied to the grid circuit of the electric valve apparatus thereby causing an increased current to be supplied to the motor 12. As a result, the speed of the motor 12 is slightly increased momentarily so as to advance the position of the gun 10 with respect to the position of the telescope 11. Owing to its increased speed, the gun 10 begins to overtake the transmitter 26, thereby lessening the angle between the transmitter 26 and receiver 28. After this angle has been diminished to its former value and the advancing movement of the transmitter 26 has been completed, the gun 10 will again be moving at the speed at which the rotor of the transmitter 26 is being rotated. The rotor of the receiver 28 and the gun 10 will now be lagging the rotor of the transmitter 26 by an angle proportional to the velocity, but since the rotor of the transmitter 26 is in advance of the telescope 11 by an angle corresponding to the velocity of the telescope, the gun 10 will be in correspondence with the telescope 11. It will, therefore, be seen that the gun 10 will be in correspondence with the telescope 11 both when the system is at rest or when in movement at any constant speed. In other words, the dynamic accuracy has been made equal to the static accuracy and the velocity lag has been eliminated.

It has been pointed out that the motor 33 constitutes a speed responsive device. In other words, its speed is a measure of the velocity of the telescope 11. It is also to be noted that the motor 33 measures the velocity of the system at an intermediate point in the connections between the telescope and the driving means, which point, in the illustrated embodiment, is the receiver 27, and that the velocity correction is introduced at a subsequent point in the connections, namely, through the differential 30. The method of measuring the velocity at one point in the connection and introducing the correction at a subsequent point is an important feature of this invention, because if the velocity correction were introduced at a point ahead of the point of measurement, there would be a tendency for the measuring means to measure the correction as well as the error and thus to introduce oscillations and instability into the system.

In the modification of Fig. 2, the bellows 36 of Fig. 1 are replaced by a cylinder 42 within which a movable piston 43 is arranged. Suitable spring means 44 are provided for centering the piston within the cylinder. The upper end of the cylinder communicates with one port of the gear pump 45, which corresponds to the pump 38 of Fig. 1, and the opposite end of the cylinder communicates with the opposite port of the pump. Each of these ports may be either an intake port or a discharge port, depending upon the direction of rotation of the pump. The piston 43 is connected through a linkage 46 to a gear 47 which corresponds to the gear 37 of Fig. 1. When the pump 45 is at rest, the piston 43 is in the central position in which it is shown and the gear 47 occupies the same position that the gear 37 of Fig. 1 occupies when the pump 38 is at rest.

The operation of the system of Fig. 2 is identical with that described for Fig. 1, with the exception that the functions performed by the pump 38 and the bellows 36 are performed by the pump 45 and the cylinder 42 and piston 43. In the event that the displacement of the piston is not as nearly proportional to the speed of the pump 45 as is desired, the wall of the cylinder may be provided with tapered slots 48 so that the by-passing effect is gradually increased as the piston moves from its center position to either end of the cylinder. Thus, if the pump 45 should have a characteristic such that the pressure increases faster than the first power of the speed, the slots 48 can be shaped so that the fluid pressure and the displacement of the piston will be proportional to the speed of the pump. The operation of this modification of the system is in all other respects identical with the foregoing description of the operation of the system of Fig. 1 and consequently a repetition of this operation is unnecessary.

In the modification of Fig. 3, the driving power for the gun 49 is supplied by a suitable electric motor 50 through a fluid pressure variable speed transmission device 51. This device is illustrated conventionally because it is a well-known device sold upon the market and because its specific internal structure constitutes no part of the present invention. It is sufficient to understand that the shaft driven by the motor 50 drives a variable stroke oil pump, which supplies a variable volume of oil to an oil motor which drives the output shaft 52. The amount of oil supplied to the oil motor is controlled by means of a control shaft 53 which, when rotated, varies the stroke of the oil pump. When no oil is supplied to the oil motor, the output shaft 52 is at rest, and when a maximum amount is supplied, the shaft 52 rotates at a maximum speed. Similarly, for intermediate rates of supply, the shaft 52 rotates at corresponding intermediate speeds.

The control shaft 53 is actuated through differential gearing 54 by an electric motor 55. Rotation of the motor 55 rotates the input element of the differential gearing and the control shaft 53 of the transmission device 51. As a result of the rotation of the control shaft, the output shaft 52 would continue to rotate indefinitely at a speed proportional to the number of rotations of the input shaft 55a if it were not for the fact that the output shaft is connected back through gearing 56 and the differential device 54 to the control shaft so that when the output shaft is rotated it turns the control shaft backward toward its initial position. As the control shaft is turned backward, the speed of the output shaft is diminished and when the control shaft is returned to its initial position, the output shaft is stopped. Thus it will be seen that with the differential gear 54 connecting the output shaft and the control shaft, the transmission device 51 functions inherently as a follow-up device and the number of rotations of the output shaft 52 corresponds exactly to the number of rotations of the input shaft in a proportion depending upon the ratio of the gearing 56. However, if the input shaft 55a is rotated continuously, the output shaft 52 will also rotate continuously and at a corresponding speed, but it will lag the input shaft by an amount proportional to the velocity of the output shaft. This amount is the same amount that the control shaft 53 would have to be rotated to cause the shaft 52 to rotate continuously at that speed if there were no differential follow-up connection between the output shaft and the input shaft. This amount may be represented by an angle, and this angle, which is proportional to the velocities of both the output shaft and the input shaft, is known as the velocity lag.

The remainder of the modification of Fig. 3 is substantially identical with the corresponding portion of the system of Fig. 1, with the exception that the mechanical differential device 30 and the fluid pressure pump 33 of Fig. 1 are respectively replaced by an electrical differential device 57 and an electrical torque motor 58. Briefly, the transmitting device 59, receiving device 60, power amplifier 61 and direct current motor 62 correspond and are identical in structure and function with the transmitting device 25, receiving device 27, power amplifier 34 and direct current motor 33, respectively, of Fig. 1. Similarly, the elements of the repeater system, that is to say, the transmitting device 63, receiving device 64, and power amplifier 65 are identical in structure and function with the corresponding transmitting device 26, receiving device 28, and power amplifier 15 of Fig 1.

The electrical differential device 57 is very similar to the transmitting and receiving devices previously described and differs from them only in that its rotor member is provided with a polycircuit distributed winding. Corresponding terminals of the stator winding of the transmitter 63 and the differential device 57 are connected together by means of connections 66 and similarly, terminals of the rotor winding of the differential device 57 are connected by means of conductors 67 to corresponding terminals of the stator winding of the receiver 64. The rotor winding of the transmitter 63 induces voltages in the stator windings which in turn cause currents to flow in the stator windings of the differential device 57, thereby producing an alternating magnetic field which in turn induces voltages in the rotor winding of the differential device. These voltages cause currents to flow in the stator winding of the receiver 64, which currents produce an alternating magnetic field and this magnetic field induces a voltage in the rotor winding of the receiver except when the axis of the rotor winding is at right angles with the axis of this magnetic field. The system is de-energized and at rest when the axis of the rotor winding of the receiver 64 is perpendicular to the axis of the magnetic field of the stator winding because no component voltage is supplied to the grid circuit of the electric valve apparatus 65 and therefore no current is supplied to the electric motor 55. If the rotor member of the differential device 57 is rotated a predetermined amount when the remainder of the system is at standstill, the position of the axis of the rotor winding is changed with respect to the position of the axis of the magnetic field of the stator winding. As a result, the relationship of the voltages induced in the separate coils of the rotor winding is changed and similarly the relationship of the currents flowing in the separate coils of the stator winding of the receiver 64 is changed. This produces a shift of the axis of the magnetic field of the receiver so that the rotor winding is no longer perpendicular to the axis and consequently a voltage is induced in the rotor windings which is supplied as a component voltage to the grid circuit of the power amplifier 65. Thus, briefly, the result of a rotation of the rotor member of the differential device 57 is to produce a change in the component voltage supplied to the input circuit of the power amplifier 65.

In operation, the rotation of the sighting telescope 68 energizes the power amplifier 61 and causes the motor 62 to drive the transmitter 63 of the repeating system at a velocity equal to the velocity of the rotor of the transmitter 59 which is connected to the telescope 68. Similarly, this rotation of the transmitter 63 of the repeater system energizes the power amplifier 65 and causes the motor 55 to drive the input shaft 55a of the variable speed transmission device 51 at a velocity corresponding to the velocity of the telescope 68 which in turn results in rotation of the output shaft 52 at a velocity corresponding to the velocity of the input shaft 53 and therefore proportional to the velocity of the telescope 68. Since the motors 62 and 64 are lightly loaded, the receiver 64 rotates in substantial correspondence with transmitter 59 and telescope 68. But, as previously pointed out, the output shaft 52 and gun 49 will lag the input shaft 55a by an angle proportional to velocity. Since the rotor of receiver 64 and input shaft 53 are both geared to motor 55, it will be clear that the gun 49 will tend to lag receiver 64 and telescope 68 by an angle proportional to velocity.

As shown, spring means 69 are provided for opposing rotation of the armature of the torque motor 58 so that it is free to rotate only through a limited angle. The armature of this motor is connected to and supplied from the same power amplifier 61 as that from which the repeater motor 62 is supplied and therefore, if its rotor were not blocked, it would tend to rotate at a speed either equal to or proportional to the speed of the motor 62, which as previously pointed out is proportional to the velocity of the telescope 68. However, since the rotor of the motor 58 is prevented from rotating, its armature draws a current through the power amplifier 61 producing a torque proportional to the current and, therefore, proportional to the velocity of the telescope. This torque rotates the rotor member of the electrical differential device 57, thereby varying the component voltage supplied to the power amplifier 65 and causing the motor 55 to increase the speed of rotation of the input shaft 55a and likewise the speed of the output shaft 52. As a result, the velocity of the gun 49 is momentarily increased above the velocity of the telescope 68 and therefore tends to overtake the telescope. At the same time, the motor 55 advances the rotor of the receiver 64 with respect to transmitter 63 and therefore with respect to telescope 68. When the angle of advance of receiver 64 becomes equal to the angle of advance of the differential device 57, the control voltage supplied to the amplifier 65 is decreased to its former value. As a result, the speed of the motor 55 is decreased to its former value and the motor continues to drive the rotor of receiver 64 and input shaft 55a at a velocity equal to that of the telescope, but in advance of the position thereof by an angle equal to the angle of advance of differential device 57; in other words, an angle proportional to the velocity of the telescope. Since it is necessary for the output shaft 52 and gun 49 to lag the position of the input shaft 55a by an angle proportional to velocity, the gun 49 will come into correspondence with the telescope at the instant that the input shaft 55a reaches a position in advance of the telescope by the same angular amount. After the gun 49 has caught up with the telescope, it is, of course, only necessary for it to rotate at the same speed as the telescope in order to remain in positional correspondence with it. However, since the position of the rotor of the receiver 64 and input shaft 55a have been advanced with respect to the position of the rotor of the transmitter 63 and likewise with respect to the position of the telescope 68, by an angle proportional to the velocity of the telescope, the gun 49, although still lagging the position of the rotor of the receiver 64, by this same angle continues in correspondence throughout the remainder of the movement of the telescope. Although this catching up or advancing action is described as taking place in a sequence of operation, it will be understood that these operations take place almost instantaneously and are not readily apparent to the eye.

In some cases, the system of Fig. 3 may give rise to a small residual error which can be overcome by the corrective means illustrated in Fig. 4, in which means are provided for an accurate comparison of the position of the gun 70 with the position of the telescope. In this modification, the transmitting device 72 and the electrical differential device 73 are identical in structure and function with the corresponding transmitting device 63 and electrical differential device 57 of Fig. 3. Likewise, the torque motor 74 is identical with the torque motor 58 of Fig. 3. For the purpose of providing the accurate comparison of the position of the gun with that of the telescope, the rotor of an electrical receiving device 75 is geared to the gun platform. This receiving device 75 is identical with those previously described in the foregoing description and consequently the description will not be repeated. The terminals of the stator winding of this receiving device are connected by means of conductors 76 to corresponding terminals of the stator winding of the transmitting device 72. The rotor winding of the receiver 75 is connected to and supplies a component voltage to the input circuit of a power amplifier 77 which is in all respects identical with the power amplifier 15 of Fig. 1. As indicated, the output circuit 78 of this power amplifier is connected across a resistance 79 which is included in the armature circuit of the torque motor 74. A time delay device illustrated as a small direct current motor 80 having its armature connected across the output circuit is provided for slightly delaying the corrective action.

In operation, if the gun 70 is out of correspondence with the telescope even after the velocity correction has been introduced as set forth in the foregoing description of the operation of the system of Fig. 3, a voltage will be introduced in the rotor winding of the receiver 75 and this voltage will be supplied as a component voltage of the input circuit of the power amplifier 77, thereby energizing the amplifier and causing it to supply a voltage across the resistance 79. This will have the effect of varying the current flowing in the armature of the torque motor 74, causing the torque of the latter to vary and to rotate the rotor of the differential device 73, the amount necessary to cause the driving means for the gun 70 to drive it into a position of accurate correspondence with the telescope. It is to be noted, that in this modification the correction for the residual error is introduced ahead of the point at which the error is measured. As previously pointed out, this tends to introduce oscillations and instabilities in the system. However, the armature of motor 80 draws a comparatively heavy current at the instant when the correction is initiated and as the armature comes up to speed, its current diminishes rapidly as its counter voltage increases. When the armature of the motor 80 draws a comparatively heavy current, the voltage across the resistance 79 is correspondingly small, but as the counter voltage of the motor increases, the voltage across the resistance 79 likewise increases. The application of the corrective voltage is delayed and the delaying action of the motor 80, therefore, seems to be very similar to the delaying action of a dashpot in applying the correcting action gradually and thereby preventing hunting.

The operation of the modified system of Fig. 4 is otherwise identical with the foregoing description of the operation of the system of Fig. 3 and will, therefore, not be repeated.

In the modification of Fig. 5, the electrical differential device 57 of Fig. 3 is replaced by the mechanical differential device 81 which is included in the shaft connections between the rotor of the receiver 82 and the rotor of the transmitter 83 of the repeater system. As indicated, the stator terminals of the receiver 82 are connected to corresponding stator terminals of the transmitter 84 which is actuated by the telescope 85. Similarly, the stator terminals of the transmitter 83 are connected to corresponding stator terminals of the receiver 86, the rotor winding of which is connected to and supplies a component voltage to the input circuit of a power amplifier 87 which is in all respects identical with the power amplifier 15 of Fig. 1. Power to drive the gun 88 is supplied by an electric motor 89 through a fluid pressure variable speed transmission device identical with the device 51 previously described in connection with Fig. 3.

When the telescope 85 is rotated, the receiver 82 follows this rotation and drives the transmitter 83 of the repeater through the differential device 81, which controls the variable transmission device 90 to drive the gun 88 in the manner already described in connection with the system of Fig. 3. As in these previously described modifications, the gun 88 will tend to lag the position of the telescope 85 by an angle proportional to the velocity of the telescope. In order to eliminate this velocity error, a mechanical speed measuring device 91 is provided for measuring the velocity of the telescope 85 and introducing a correction proportional to the velocity. Since mechanical velocity measuring devices are well-known and obtainable on the market, the device 91 is shown conventionally in the drawings. It is provided with an input shaft 92 which is rotated by the receiver 82 at a speed corresponding to the velocity of the telescope 85 and the output shaft 93 is displaced an amount proportional to the speed of the input shaft 92. The displacement of the output shaft 93 actuates the third element of the differential device 81 to introduce correction in the connections between the receiver 82 and the repeater transmitter 83 which is similar and equal to the correction introduced through the differential device 30 in the modification of Fig. 1. Accordingly, a repetition of the description of the manner in which this correction is introduced is omitted. It is pointed out, however, that as in the systems of Figs. 1 and 3, the velocity is measured ahead of the point in the connections at which the correction is introduced. As a result, no oscillations or instability are introduced into the system along with the correction.

The modification of Fig. 5 is in all other respects identical with the previously described operation of the modification of Fig. 3.

Although in accordance with the provisions of the patent statutes, this invention is described as embodied in concrete form, it will be understood that the apparatus, elements, and their organization is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. Means for moving an object in positional agreement with a pilot device comprising driving means for said object, said driving means having a control element, means for actuating said control element to control said driving means to drive said object toward correspondence with said pilot device in response to positional disagreement of said element and device comprising a transmitting device actuated by said pilot device, a receiving device connected to said driving means, and connections between said transmitting and receiving devices, differential means in said connections, means connected to said differential means and responsive to velocity of said pilot device for actuating said differential means to advance said driven object an amount dependent upon velocity thereby substantially to eliminate velocity lag.

2. Automatic synchronizing apparatus comprising in combination with a movable pilot device and a driven object, driving means for said object, means responsive to positional disagreement of said device and object for controlling said driving means to drive said object toward a position of correspondence with said device at a velocity proportional to the amount of said positional disagreement comprising a transmitting device connected to said pilot device, a receiving device connected to said driving means and connections between said transmitting and receiving devices, differential means in said connections, and means for actuating said differential means to control said driving means to advance said object an amount proportional to the velocity of said pilot device thereby to eliminate said positional disagreement.

3. A follow-up system comprising in combination a pilot device, a remote object, driving means for said object, means for controlling said driving means to drive said object toward a position of correspondence with said pilot device at a velocity proportional to positional disagreement of said pilot device and object comprising an electrical transmitting device connected to said pilot device, an electrical receiving device connected to said object and connections between said transmitting and receiving devices, differential means included in said connections, and means responsive to the velocity of said pilot device for introducing a correction through said differential means to cause said driving means to advance the position of said object an amount dependent upon said velocity thereby substantially to eliminate said positional disagreement while said pilot device is in motion.

4. A follow-up control system comprising a movable pilot device, a remote object, driving means for said object, electric valve apparatus for controlling said driving means, means responsive to positional disagreement of said device and object for energizing said valve apparatus to control said driving means to drive said object toward a position of correspondence with said device comprising a transmitting device actuated by said pilot device, a receiving device connected to said driving means and connections between said transmitting and receiving devices, a differential device included in said connections, and means for actuating said differential means to cause said valve apparatus to control said driving means to advance the position of said object an amount proportional to the velocity of said pilot device thereby to eliminate the velocity lag.

5. A follow-up system comprising in combination a pilot device, a remote object, driving means for said object, means responsive to positional disagreement of said object and said device for energizing said driving means to drive said object toward a position of correspondence with said device comprising a transmitting device actuated by said device, a receiving device connected to said driving means and connections between said transmitting and receiving devices, differential means included in said connections, and means for measuring the velocity of said pilot device at a point between said differential means and pilot device and actuating said differential means to cause said driving means to advance the position of said object an amount proportional to said velocity.

6. A follow-up control system comprising a pilot device, a remote object, driving means for said object, control means for said driving means, means responsive to angular disagreement of said device and object for actuating said control means to energize said driving means to drive said object into angular correspondence with said pilot device comprising a transmitting device actuated by said pilot device, a receiving device connected to said driving means and connections between said transmitting and receiving devices, and means responsive to the velocity of said transmitting device for introducing an angular correction in said connections thereby to eliminate said angular disagreement.

7. A follow-up control system for driving an object into positional agreement with a pilot device comprising driving means for said driven object, means responsive to positional disagreement of said object and device for energizing said driving means to drive said object toward positional correspondence with said pilot device, an electric motor controlled by said pilot device and pump means driven by said motor for developing a fluid pressure in accordance with the velocity of said device and means responsive to said fluid pressure for controlling said driving means to advance said object an amount proportional to said velocity thereby substantially to eliminate said positional disagreement.

8. Automatic synchronizing apparatus for driving an object into positional agreement with a pilot device comprising driving means for said object, means responsive to positional disagreement of said device and object for energizing said driving means to drive said object toward a position of correspondence with said device comprising a receiving device and connections between said pilot device and receiving device, an electric follow-up motor controlled by said devices, a mechanical connection between said motor and said receiving device, a second electric motor controlled by said pilot device and a differential device included in said connections and actuated by said second motor for controlling said driving means to advance said object an amount proportional to the velocity of said pilot device thereby substantially to eliminate said angular disagreement.

9. A follow-up control system comprising a pilot device, a driven object, driving means for said object, means responsive to angular disagreement of said device and object for controlling said driving means to drive said object toward a position of correspondence with said device comprising an electrical transmitting device actuated by said device, an electrical receiving device connected to said driving means, and connections between said transmitting and receiving devices, a differential device in said connections, electric valve apparatus controlled by said pilot device and an electric motor controlled by said valve apparatus for actuating said differential device to introduce an angular correction into said connections to cause said driving means to advance said object an amount proportional to the velocity of said pilot device.

10. A follow-up control system comprising a pilot device, a remote object, driving means having a variable speed transmission having a control element, an output shaft and a differential connection between said shaft and element for stopping said transmission after a number of revolutions of the output shaft dependent upon the operation of said control element, means responsive to positional disagreement of said pilot device and driven object for actuating said control element to drive said object toward a position of correspondence with said pilot device, and means for actuating said control element to advance the position of said object an amount proportional to the velocity of said pilot device, thereby to eliminate said positional disagreement.

11. Automatic synchronizing apparatus for driving an object into positional correspondence with a pilot device comprising driving means for said object, means responsive to positional disagreement of said object and device for controlling said driving means to drive said object toward a position of correspondence with said device comprising an electrical transmitting device actuated by said device, an electrical receiving device connected to said driving means, electrical connections between said transmitting and receiving devices, and an electrical differential device included in said connections, and means for actuating said differential device to control said driving means to advance the position of said object an amount proportional to the velocity of said pilot device, thereby substantially to eliminate said positional disagreement.

12. A control system for causing a massive object to reproduce the movement of a light pilot device comprising driving means for said object, means responsive to angular disagreement of said device and object for controlling said driving means to drive said object toward a position of correspondence with said device comprising an electrical transmitting device actuated by said control device, an electrical receiving device connected to said driving means, and electrical connections between said transmitting and receiving devices, an electrical differential device included in said connections, and an electrical torque motor responsive to the speed of said pilot device for actuating said differential device to introduce an angular correction proportional to the speed of said device thereby to control said driving means to advance the position of said object and eliminate said angular disagreement.

13. A follow-up control system comprising a pilot device, a remote object, driving means for said object comprising a fluid pressure operated variable speed transmission having an input control shaft and an output shaft connected to said object, means responsive to angular disagreement of said pilot device for controlling said driving means to drive said object toward correspondence with said pilot device comprising an electrical transmitting device actuated by said pilot device, an electrical receiving device connected to said control shaft and electrical connections between said transmitting and receiving devices, means for measuring the velocity of said pilot device at a point between said driving means and pilot device, and means for introducing an angular correction in the control between said measuring means and driving means to cause said driving means to advance the position of said object an amount proportional to the velocity of said pilot device.

14. A control system for moving a massive object in positional agreement with a pilot device comprising a fluid pressure motor having an input control shaft and an output shaft connected to said object and a differential device connecting said shafts to provide for stopping said output shaft after an amount of rotation proportional to the rotation of said input shaft, an electric motor connected to drive said control shaft, electric valve means for supplying said motor, means responsive to angular disagreement of said pilot device and object for controlling said driving means to drive said object toward correspondence with said pilot device comprising an electrical transmitting device actuated by said pilot device, an electrical receiving device driven by said motor and electrically connected to control said valve apparatus, and electrical connections between said transmitting and receiving devices, and means for measuring the velocity of said pilot device and controlling said valve apparatus to advance the position of said object proportionally to the velocity of said pilot device.

15. A follow-up control system comprising in combination, a pilot device, a remote object, driving means for said object comprising a fluid pressure variable speed transmission device having an output shaft connected to drive said object, an input control shaft and a differential connecting said shafts for stopping said output shaft after an amount of rotation proportional to the rotation of said input shaft, electric valve means and a motor supplied therefrom for actuating said control shaft, means responsive to angular disagreement for controlling said driving means to drive said object toward correspondence with said pilot device comprising an electrical transmitting device actuated by said pilot device, an electrical receiving device connected to said motor for controlling said valve apparatus, and connections between said transmitting and receiving devices, means in said connections for measuring the velocity of said pilot device, and means controlled by said measuring means for introducing a correction in said connections at a point between said driving means and point of measurement for controlling said valve apparatus to eliminate said angular disagreement.

16. Means for causing an object to move in positional agreement with a pilot device comprising driving means for said object, means responsive to positional disagreement of said pilot device and object for controlling said driving means to drive said object toward correspondence with said device comprising an electrical transmitting device connected to said pilot device and an electrical receiving device connected to said object, means for advancing the position of said object to eliminate said disagreement comprising a differential means included in the connections between said pilot device and said object, and a torque motor whose torque is responsive to the velocity of said pilot device for actuating an input member of said differential means an amount proportional to the velocity of said pilot device.

ERNST F. W. ALEXANDERSON.